United States Patent
Wee et al.

(10) Patent No.: US 9,754,727 B2
(45) Date of Patent: Sep. 5, 2017

(54) ENERGY CHARGE STORAGE DEVICE USING A PRINTABLE POLYELECTROLYTE AS ELECTROLYTE MATERIAL

(75) Inventors: Tsyh Ying Grace Wee, Singapore (SG); Martti Kaempgen, Singapore (SG); Madhavi Srinivasan, Singapore (SG); Andrew Grimsdale, Singapore (SG); Subodh Mhaisalkar, Singapore (SG); Yin Chiang Freddy Boey, Singapore (SG)

(73) Assignee: Nanyang Technological University, Singapore (SG)

( * ) Notice: Subject to any disclaimer, the term of this patent is extended or adjusted under 35 U.S.C. 154(b) by 178 days.

(21) Appl. No.: 13/380,007

(22) PCT Filed: Jun. 26, 2009

(86) PCT No.: PCT/SG2009/000236
§ 371 (c)(1),
(2), (4) Date: Mar. 19, 2012

(87) PCT Pub. No.: WO2010/151227
PCT Pub. Date: Dec. 29, 2010

(65) Prior Publication Data
US 2012/0171575 A1   Jul. 5, 2012

(51) Int. Cl.
*H01M 10/0565*   (2010.01)
*H01G 9/022*   (2006.01)
(Continued)

(52) U.S. Cl.
CPC ............. *H01G 9/038* (2013.01); *H01B 1/122* (2013.01); *H01G 9/155* (2013.01); *H01G 11/56* (2013.01);
(Continued)

(58) Field of Classification Search
CPC .................................................. H01M 8/1004
(Continued)

(56) References Cited

U.S. PATENT DOCUMENTS 5,654,640 A * 8/1997 Bailey ........................... 324/435
5,693,434 A * 12/1997 Li et al. ......................... 429/310
(Continued)

FOREIGN PATENT DOCUMENTS

EP   1335395   * 11/2004
WO   98/22989 A1   5/1998
(Continued)

OTHER PUBLICATIONS

Carretta, N. et al., "Ionomeric membranes based on partially sulfonated poly(styrene): synthesis, proton conduction and methanol permeation," Journal of Membrane Science, vol. 166:189-197, 2000.
(Continued)

*Primary Examiner* — Olatunji Godo
(74) *Attorney, Agent, or Firm* — Seed IP Law Group LLP

(57) ABSTRACT

An energy charge storage device, particularly from the group consisting of super capacitor, a hybrid electrochemical capacitor, a metal hydride battery and a fuel cell, comprising a first and second electrode and an electrolyte wherein the electrolyte comprises a printable polyelectrolyte e.g. polystyrene sulfonic acid (PSSH). The present invention also refers to methods of obtaining such energy storage device.

17 Claims, 10 Drawing Sheets

(51) Int. Cl.
*H01B 1/12* (2006.01)
*H01G 9/00* (2006.01)
*H01G 11/56* (2013.01)
*H01G 11/60* (2013.01)
*H01M 8/1023* (2016.01)
*H01M 8/1046* (2016.01)
*H01M 8/1069* (2016.01)
*H01M 10/34* (2006.01)

(52) U.S. Cl.
CPC .......... *H01G 11/60* (2013.01); *H01M 8/1023* (2013.01); *H01M 8/1046* (2013.01); *H01M 8/1076* (2013.01); *H01M 10/347* (2013.01); *Y02E 60/13* (2013.01); *Y02P 70/54* (2015.11); *Y02P 70/56* (2015.11); *Y10T 29/49108* (2015.01)

(58) Field of Classification Search
USPC ....................................................... 429/301
See application file for complete search history.

(56) References Cited

U.S. PATENT DOCUMENTS

| | | |
|---|---|---|
| 6,183,914 B1 * | 2/2001 | Yao ........................ H01M 6/181 429/309 |
| 6,356,432 B1 | 3/2002 | Danel et al. |
| 6,358,651 B1 | 3/2002 | Chen et al. |
| 6,720,109 B1 * | 4/2004 | Takeuchi ............. C08G 61/122 429/213 |
| 2005/0079409 A1 * | 4/2005 | Andelman et al. ............. 429/94 |
| 2006/0127764 A1 | 6/2006 | Chen et al. |
| 2007/0085061 A1 | 4/2007 | Elder et al. |
| 2008/0118826 A1 * | 5/2008 | Shimamura et al. ......... 429/129 |

FOREIGN PATENT DOCUMENTS

| | | | |
|---|---|---|---|
| WO | WO 98/42037 | * | 9/1998 |
| WO | 01/71835 A2 | | 9/2001 |
| WO | 03/092094 A2 | | 11/2003 |
| WO | 2005/090480 A1 | | 9/2005 |
| WO | 2006/073474 A2 | | 7/2006 |
| WO | WO 2007/146413 | * | 12/2007 |
| WO | WO 2008/062149 | * | 5/2008 |
| WO | 2009/027993 A1 | | 3/2009 |

OTHER PUBLICATIONS

Kumar, M. S. et al., "Polyvinyl alcohol-polystyrene sulphonic acid blend electrolyte for supercapacitor application," Physica B, vol. 404:1143-1147, 2009.

Mao, Li cai et al., "Application of gel polymer electrolytes in Ni/MH battery," Functional Materials, vol. 36, No. 9, Nov. 3, 2005, pp. 1389-1390, with English abstract.

* cited by examiner (A)

(B)

ENERGY CHARGE STORAGE DEVICE USING A PRINTABLE POLYELECTROLYTE AS ELECTROLYTE MATERIAL

FIELD OF THE INVENTION

The present invention relates to the field of electrochemistry and polymer chemistry, in particular the electrochemistry of energy charge storage devices.

BACKGROUND OF THE INVENTION

Electrochemical capacitors (ECs) often called as "Supercapacitors" have been considered to be one of the most important power sources in several devices including memory back-ups, hybrid power systems for electric vehicles, military and medical applications, digital communications and are currently widely investigated because of their interesting characteristics in terms of high power densities and long cycle life.

ECs are electrical devices with highly reversible charge storage and delivery capabilities. ECs have properties complementary to secondary batteries and are composed, e.g., of carbon based electrodes and an electrolyte.

An electrolyte is any substance containing free ions that behaves as an electrically conductive medium. Because electrolytes generally consist of ions in solution, electrolytes are also known as ionic solutions, but molten electrolytes and solid electrolytes are also possible. ECs and other energy charge storage devices, such as batteries, employ both aqueous and non-aqueous electrolytes in either liquid or solid state. The performance of the supercapacitor is related to the characteristics of the electrode material and the electrolyte employed in the device. The energy density (Wh/kg) of the supercapacitor is expressed as $$\text{Energy density (Wh/kg)} = \frac{1}{8}(F/g) \times \frac{V_0^2}{3.6}$$

Where F/g is the specific capacitance of the electrode material and $V_0$ is the cell voltage dependant primarily on the electrolyte used in the device. Liquid electrolytes like aqueous electrolyte solution and organic electrolyte solution are the commonly used as electrolyte in EC. Among these, aqueous electrolytes are popular, because of low cost, ease of fabrication in ambient conditions. However decomposition voltage of aqueous solvent limits the supercapacitor cell voltage to 1.0 V. Non-aqueous or organic electrolytes based supercapacitors provide higher operating voltage (2 to 3 V) thus possess higher energy density but are expensive and require handling under controlled atmospheres (glove box) to keep it pure/dry. One of the main concerns of both organic and aqueous liquid electrolyte based supercapacitors is the risk of electrolyte leakage affecting the device reliability and safety. On the other hand solid electrolytes consisting of polymer or polymeric gel electrolyte circumvent this issue and provide advantages of compactness and reliability without leakage of liquid components. However, ionic conductivity of these electrolytes (in the range of $10^{-10}$ to about $10^{-7}$ S*cm$^{-1}$) is too low to be of any use in practical devices. Hence polymer electrolytes under investigation contain salt additives which are entrapped in the polymeric gel moiety to improve its conductivity.

Although, present day printed electronics devices can be made using simple roll-to-roll printing processes, conventional batteries/supercapacitors are not fully compatible with devices such as smart cards, electronic paper, wearable electronics, and the like. Ideally these necessitate printable supercapacitors and batteries that can be directly printed on to surface of electronics and thus can be directly integrated in to disposable displays like RFID tags. Considerable effort worldwide has been directed on the research and development of suitable electrode materials for printable flexible supercapacitors. However, these first generation prototypes still consist of liquid based electrolyte or polymer electrolyte consisting of a liquid component. This is a major drawback as such liquid based components will require additional encapsulation that will hinder the flexibility and/or printability of the charge storage device in sync with the printed electronics.

Hence there is an ongoing demand to obtain suitable candidate materials that can act as electrolyte without compromising on the device performance.

SUMMARY OF THE INVENTION

In a first aspect, the present invention refers to an energy charge storage device comprising a first and second electrode and an electrolyte, wherein said electrolyte comprises a printable polyelectrolyte.

In still another aspect, the present invention refers to a method of manufacturing an energy charge storage device, comprising:
  preparing a polymer film made of a printable polyelectrolyte referred to herein; and
  arranging the polymer film in between a first and a second electrode.

BRIEF DESCRIPTION OF THE DRAWINGS

The invention will be better understood with reference to the detailed description when considered in conjunction with the non-limiting examples and the accompanying drawings, in which:

FIG. 3(B)); poly(styrenesulfonic acid) lithium (FIG. 3(C)); poly(vinylbenzyltrimethyl-ammonium chloride) (PVTAC) (FIG. 3(D)).

In FIG. 14(A) PSSH has been used; in FIG. 14(B) $PSSH+H_3PO_4$ has been used; and in FIG. 14(C) $PVA+H_3PO_4$ has been used.

In FIG. 15(A) PSSH has been used and in FIG. 15(B) $PVA+H_3PO_4$ has been used.

DETAILED DESCRIPTION OF THE INVENTION

Figure 1:
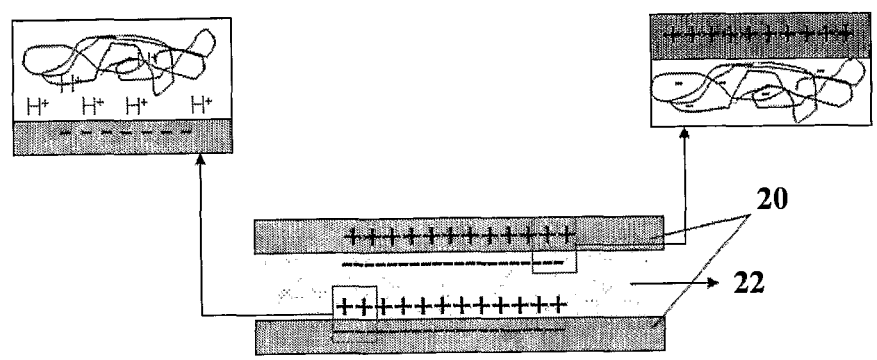
FIG. 1 illustrates the principle of an energy charge storage device using a polyelectrolyte described herein as electrolyte. Polyelectrolytes are polymers whose repeating units bear a functional electrolyte group. Upon application of an electrical field, the dissociable ion of the polyelectrolyte 22 will move towards one of the electrodes 20 (left inset showing the exemplary movement of a hydrogen ion (H$^+$) towards the negative electrode) having the opposite charge of the dissociable ion while the polymer backbone remains in place (right inset) and thus results in a charge separation.

In a first embodiment, the present invention is directed to an energy charge storage device comprising a first and second electrode and an electrolyte, wherein said electrolyte comprises or consists of a printable polyelectrolyte. In another embodiment, the energy charge storage device comprises a first and second electrode and an electrolyte, wherein the electrolyte comprises a printable homopolymeric polyelectrolyte.

In another embodiment, the present invention is directed to an energy charge storage device comprising a first and second electrode and an electrolyte, wherein the electrolyte comprises a printable copolymeric polyelectrolyte.

"Printable" means that the polyelectrolytes are capable of being printed. Methods which can be used for printing are known in the art and include roll-to-roll printing, screen printing, ink-jet printing to name only a few. Nafion® for example is an example for a non-printable copolymeric polyelectrolyte which is not comprised as printable polyelectrolyte of the present invention.

In general, a certain liquidity is needed to ensure printability since the shape of the polyelectrolyte electrolyte needs to be changed upon printing (from bulk to a thin layer). The viscosity required depends on the printing technique used and is in general around 0.1 to about 20 Pa*s [Pascal*Second]. "Viscosity" is the quantity that describes a fluid's resistance to flow. Fluids resist the relative motion of immersed objects through them as well as to the motion of layers with differing velocities within them. After printing, the polyelectrolyte electrolyte dries/solidifies and stays in shape. Thus, in one embodiment, the printable polyelectrolyte is a polyelectrolyte with a viscosity of between about 0.1 Pa*s to about 20 Pa*s (1 P to 200 P (P=poise)) or between about 1 Pa*s to about 12 Pa*s. In another embodiment the viscosity of the polyelectrolyte upon application, i.e. before it dries/solidifies is at least 0.1 Pa*s or at least 1 Pa*s. The dried or solidified polyelectrolyte electrolyte is still flexible and has a gel like consistency.

"Polyelectrolyte" means a polymer which is composed of macromolecules in which a substantial portion of the repeating units contains ionic or ionizable groups or both. Terms having the same meaning are polymer electrolyte or polymeric electrolyte. These terms, i.e. polyelectrolyte, polymer electrolyte and polymeric electrolyte, should not be confused with the term solid polymer electrolyte. A solid polymer electrolyte is not a polyelectrolyte. An example of a solid polymer electrolyte is a solution of a lithium salt in a poly(oxyethylene) matrix; the ionic conductivity of such material is due to the mobility of lithium cations and their counterions in an electric field.

Polyelectrolytes comprise dissociable ions (+ or −) which form part of the polymer chain of the polyelectrolyte. Depending on the kind of the dissociable ions polyelectrolytes are divided into polyacids and polybases.

As to polyacids, upon dissociation in aqueous solutions (such as water) protons split of and polyanions are formed. Polyanions can be inorganic or organic polymers. Examples for polyacids whose salts are designated as polysalts are characterized by base units, such as polyphosphoric acid, polyvinyl sulphuric acid, polyvinyl sulphonic acid, polyvinyl phosphonic acid, polymaleic acid and polyacrylic acid.

Polybases comprise units which are able to accept protons, for example by forming salts through reaction with acids. Exemplary polybases are polyethyleneimine, polyvinylamine and polyvinylpyridines.

The properties of polyelectrolytes are defined mainly by the electrostatic interactions within the macromolecule and with the small counter ions (dissociable group) which compensates their charge. A structure related property of polyelectrolytes is that their solutions are electrically conductive (like a salt) and are often viscous (like a polymer) rendering most of them printable and flexible. The polymer based electrolyte currently employed in the art have poor conductance and hence have an additional salt added to it, however this additional component can be eliminated when using the polyelectrolytes referred to herein in one embodiment as replacement for the known polymer electrolytes because the polyelectrolytes themselves are ionic in nature thus cutting down the number of components. Therefore, when using polyelectrolytes the use of such additional salts (additional conductive salts) can be avoided. Thus, in one embodiment, the printable polyelectrolyte which are used as electrolyte do not comprise an additional salt component.

The use of polyelectrolytes referred to herein as electrolyte results in a higher specific capacitance of the energy charge storage device, avoids the need to encapsulate the device because the polyelectrolyte membrane is leak proofed, forms flexible thin films with many different solvents (including water) and the polyelectrolyte films employed are printable and easy to handle.

Depending on the application, the polyelectrolytes referred to herein dissociate either in positive mobile ion/ negatively charged polymer (leading to cationic conductivity; see e.g. FIG. 1) or negative mobile ion/positively charged polymer chain (leading to anionic conductivity).

"Homopolymeric" polyelectrolyte means that this polymer electrolyte consists of identical monomer units. Depending on the application, the homopolymeric polyelectrolyte consists of monomers which are either an acid or a base. Therefore, in one embodiment, the homopolymeric polyelectrolyte is a polyacid consisting of a polyanion and a dissociable positive ion, or a polybase consisting of a polycation and a dissociable negative ion.

A polyacid can include, but is not limited to alginic acid, phytic acid, polyvinyl sulphuric acid, polyvinyl sulphonic acid, polyvinyl phosphonic acid, polyacrylic acid, polymethacrylic acid, polyanetholsulphonic acid, polystyrene sulfonic acid, oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, derivatives of the aforementioned substances and combinations thereof.

A polybase can include, but is not limited to polyvinylpyridine, polyvinylaziridine, polyimidazole, polylysine, chitosan, poly(amino and alkylated amino)ethylenes, ethoxylated polyethyleneimine, propoxylated polyethyleneimine, polyethyleneimine, polyvinylamine, poly(2-vinylpyridine), poly(4-vinylpyridine), poly(2-methyl-5-vinylpyridine), trimethylamino polysterene, polyallylamine (including N-alkylated and N,N-dialkylated polyallylamines), polydiallyldimethylammonium, di(pentyl-5-trimethylamino)-9-polyfluorene, ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl) amine, 1,1,4,7,10,10-hexamethyl triethylenetetramine, tetramethyl-p-phenylenediamine, tetramethylethylenediamine, triethylenetetraamine, 4,4'-bipyridyl derivatives of the aforementioned substances or combinations thereof.

A "copolymeric" polyelectrolyte consists of at least two different polymer electrolyte monomers. In case the copolymeric polyelectrolyte is supposed to consist of a positive mobile counter ion and a negatively charged polymer (leading to cationic conductivity), the monomer is an acid which can include, but is not limited to phosphonic acid, acrylic acid, vinyl sulphuric acid, vinyl sulphonic acid, vinyl phosphonic acid, methacrylic acid, anetholsulphonic acid, styrene sulfonic acid or derivatives thereof. In case the copolymeric polyelectrolyte is supposed to consist of a negative mobile ion and a positively charged polymer chain (leading to anionic conductivity), the monomer is a base which can include, but is not limited to ethyleneimine, vinylamine, 2-vinylpyridine, 4-vinylpyridine, 2-methyl-5-vinylpyridine, trimethylamino styrene, allylamine, diallyldimethylammonium, di(pentyl-5-trimethylamino)-9-fluorene or derivatives thereof. An example of a copolymeric polyelectrolyte would be a random copolymer of vinyl phosphonic acid, maleic acid and acrylic acid. Examples of printable copolymeric polyelectrolytes can include, but are not limited to polyacrylonitrile-acrylic acid), poly(styrene-acrylic acid), poly(butadiene-acrylonitrile acrylic acid), poly(butylacrylate-acrylic acid), poly(ethyl acrylate-acrylic acid), poly(styrene-co-maleic acid), poly(ethylene-propylene-acrylic acid), poly(propylene-acrylic acid).

A copolymeric polyelectrolyte not included in the present invention is Nafion®. The structure of Nafion® is a result of incorporating perfluorovinyl ether groups terminated with sulfonate groups onto a tetrafluoroethylene (Teflon) backbone. Nafion® is an ionomer which means that it is not water soluble. Nafion® can be produced as both a powder resin and a copolymer and has therefore acquired several IUPAC names. Nafion®-H, for example, includes the following systematic names: From Chemical Abstracts: ethanesulfonyl fluoride, 2-[1-[difluoro-[(trifluoroethenyl)oxy] methyl]-1,2,2,2-tetrafluoroethoxy]-1,1,2,2-tetrafluoro-, with tetrafluoroethylene or tetrafluoroethylene-perfluoro-3,6-dioxa-4-methyl-7-octenesulfonic acid copolymer. The molecular weight of Nafion® is uncertain due to differences in processing and solution morphology. Conventional methods of determining molecular weight such as light scattering and gel permeation chromatography are not applicable because Nafion® is of course insoluble, although the molecular weight has been estimated at $10^5$-$10^6$ Da. Instead, the equivalent weight (EW) and material thickness are used to describe most commercially available membranes. The EW is defined as the weight of Nafion® per mole of sulfonic acid group. For example, Nafion® 117 represents 1100 g EW+0.007 inch in thickness. In contrast equivalent weight, conventional ion-exchange resins are usually described in terms of their ion exchange capacity (IEC) which is inversely proportional to the equivalent weight.

A general chemical structure of Nafion® can be seen below in Formula (I), where X is either a sulfonic or carboxylic functional group, and M is either a metal cation in the neutralized form or an $H^+$ in the acid form.

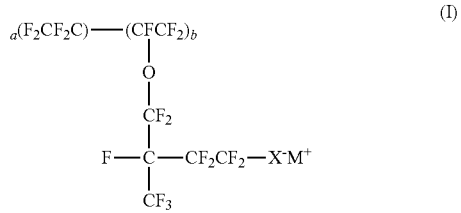

Compared to other polyelectrolytes referred to herein, the preparation of Nafion® is costly and requires hot pressing methods to form films or membranes and is thus not printable as the other polyelectrolytes referred to herein.

The dissociable counter ion of the polyelectrolyte referred to herein can include, but is not limited to $F^-$, $Cl^-$, $Br^-$, $I^-$, $OH^-$, $HSO_4^-$, $SO_4^{2-}$, $H_2PO_4^-$, $HPO_4^{2-}$, $PO_4^{3-}$, $ClO_4^-$, $PF_6^-$ or $BF_4^-$ in case of using polybases or can include, but is not limited to $H^+$, $NH_4^+$, $Li^+$, $Na^+$, $K^+$, $Rb^+$, $Et_4N^+$, $Bu_4N^+$ or $Cs^+$ in case of using polyacids.

Figure 2:
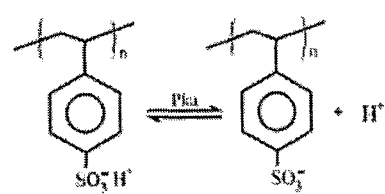
FIG. 2 shows a monomer of the homopolymeric polyelectrolyte poly(styrenesulfonic acid) in its hydrolyzed form (right image) and non-hydrolyzed form (left image).
Figure 3:
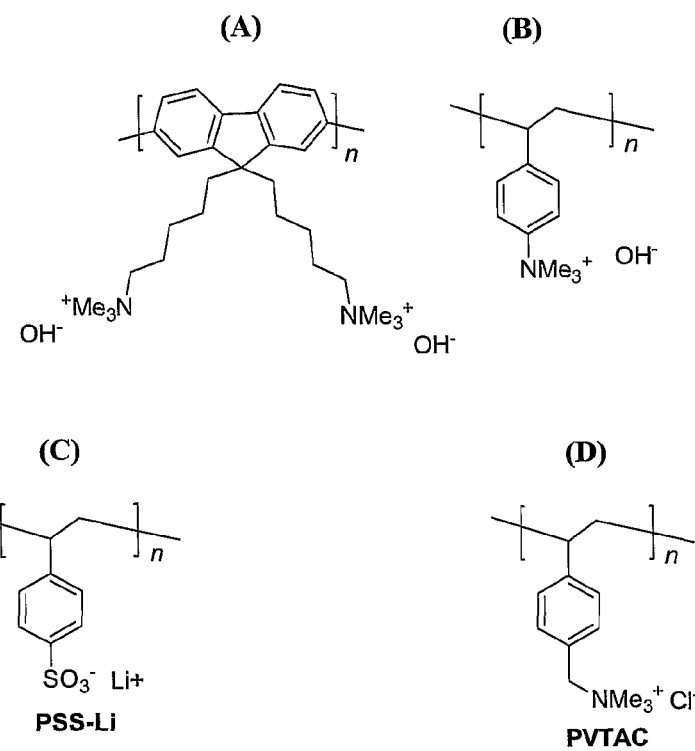
FIGS. 3 (A) to (D) shows further examples of monomers used for the synthesis of polyelectrolytes including the dissociable counter ion, namely poly(di(pentyl-5-trimethylamino)-9-fluorene hydroxide (FIG. 3(A)); trimethylamino-polystyrene hydroxide (PS-NMe$_3^+$.

For example, with reference to FIG. 2, it is possible to use $PSS^-H^+$ or $PSS^-NH_4^+$, or $PSS^-Li^+$, $PSS^-Na^+$, $PSS^-K^+$, $PSS^-Rb^+$ or $PSS^-Cs^+$. FIG. 3(D) shows an example of a polybase, namely PVTAC (poly(vinylbenzyltrimethyl-ammonium chloride)). Instead it would also be possible to use $PVTA^+F^-$, $PVTA^+Br^-$, $PVTA^+I^-$ or $PVTA^+OH^-$. For example, air batteries and alkaline fuel cells use $OH^-$, Li-ion batteries use $Li^+$, acid fuel cells use $H^+$ and supercapacitors in general work with any ion.

Depending on the application different electrode materials can be used for the first and second electrode. In one embodiment, the first electrode is composed of a first material while the second electrode is composed of a material different from the material used for the first electrode. In another embodiment, the first and second electrode are made of the same material. The electrodes can be made of any material known in the art to be usable as electrode material.

Examples for electrode materials include, but are not limited to metals, metal oxides, alloys, conductive polymers, metal sulfides, graphit, carbonaceous materials, metal oxide particle coated nanostructured materials, nobel metal particle coated nanostructured materials, ceramic, glass, isinglass (Muscovy-glass), borosilicate glass, acrylic glass or metal oxynitrides, such as aluminium oxynitride.

The carbonaceous material can include but is not limited to activated carbon, carbon blacks and graphene. The metal electrode material can include, but is not limited to a noble metal, such as silver, gold, platinum or palladium; copper, zinc, manganese, nickel, molybdenum, vanadium, aluminium, lead, beryllium, niobium, magnesium, iron, tungsten, cobalt, cadmium, titanium or mixtures of the aforementioned metals such as copper tungsten, silver tungsten, to name only a few. Other examples of metal oxide electrode materials include $LiMO_2$ (with M=Ni, Co, V) and Spinels.

The general formula of the Spinel Group is $AB_2O_4$. The A represents a divalent metal ion such as magnesium, iron, nickel, manganese and/or zinc. The quad valent lead ion can also occupy this site. The B represents trivalent metal ions such as aluminum, iron, chromium and/or manganese, titanium may also occupy this site with a +4 charge and lead at +2 can occupy this site.

Further specific examples of metal oxides which can be used as electrode material include, but are not limited to $PtO_2$, $V_2O_3$, $V_2O_5$, $Nb_2O_5$, $NiO_2 \cdot xH_2O$, $LiCoO_2$, $LiFeO_2$, $LiMn_2O_3$, $Li_2MoO_4$, $Li_2TiO_3$, $MnO_2$, $Ag$—$MnO_2$, $Al_2O_3$, $MoO_3$, $TiO_2$, $SiO_2$, $ZnO_2$, $SnO_2$, $Fe_2O_3$, $NiO$, $Co_3O_4$, $CoO$, $Nb_2O_5$, $W_2O_3$ and mixtures thereof; wherein said metal oxide can be either stoichiometric or non-stoichiometric (e.g. $Me_{n-x}O_{m-y}$, $0<x<1$; $0<y<1$; $1\leq n\leq 3$; $1\leq m\leq 5$), to name only a few. Examples for an alloy can include, but are not limited to alloys of lithium/aluminium, Au, or Pt, or Pd, or Cu, or In, or InSe, or CuSe, or $SnS_2$ or mixtures thereof or $Ag_2Ni$.

Conductive polymers which can be used as electrode materials include, but are not limited to polyacetylenes, polypyrroles, polythiophenes, polyanilines, polyfluorenes, poly-3-alkylthiophenes, polynaphthalenes, poly(p-phenylene-sulfide and poly(para-phenylene vinylenes, derivatives thereof or doped forms of the aforementioned conductive polymers.

Examples for other electrode materials can include Metal oxide particle or nobel metal particle coated nanostructured materials. The metal oxide used for the metal oxide particle can include any one of the metal oxides already referred to above.

The particles are bound to the surface of the nanostructured material and can have a maximal dimension of about 20 nm or between about 0.5 to 20 nm, or about 0.5 to 15 nm, or about 0.5 to 12, or about 0.5 to 5 nm, or about 5 nm to about 12 nm or about 5 to about 15 nm. The particle size distribution for particles with a size of between about to 20 nm can be about ±5; wherein the particle size distribution for particles with a size of between about ≥5 to <12 nm can be about ±3 nm and wherein the particle size distribution for particles with a size of between about 2 to <5 nm can be about ±1 nm.

The nanostructured material to which those particles are bound can comprise pores having a maximal dimension of between about 2 nm to about 5 μm or 2 to 50 nm (mesopores) or >50 nm to about 5 μm (macropores).

The particles can be chemically bound to the surface of the nanostructured material. They can be chemically bound to the surface of the nanostructured material via a linker (functional group) located (bound) at the surface of the nanostructured material, wherein the linker can include, but is not limited to a hydroxyl group, pyrenes, esters, thiols, amines, a carboxyl group or mixtures thereof. The carboxyl group can be comprised in a molecule which includes, but is not limited to formic acid, acetic acid, propionic acid, butanoic acid, pentanoic acid, hexanoic acid, cycloalkane carboxylic acids, or benzoic acids, such as 4-aminobenzoic acid. The hydroxyl group can be comprised in a molecule which includes, but is not limited to phosphoric acid or sulfonic acid.

In one embodiment, between about 5 to about 80% of the surface area of the nanostructured material can be covered with the particles and the particles are evenly dispersed over the whole surface of the nanostructured material.

The nanostructured material can include, but is not limited to nanotubes, nanowires (also called nanofibers), nanoflakes, nanoparticles, nanodiscs, nanofilms or combinations of the aforementioned nanostructured materials in a mixture. The nanotubes can be single-walled or double-walled or multi-walled nanotubes and can be based on carbonaceous materials as described herein or $TiO_2$ nanotubes.

Nanostructured materials have dimensions typically ranging from 1 to 100 nm (where 10 angstrom=1 nm=1/1000 micrometer). They can be classified into the following dimensional types:
Zero dimensional (0D): nanospherical particles. (also called nanoparticles);
One dimensional (1D): nanorods, nanowires (also called nanofibers) and nanotubes; and
Two dimensional (2D): nanoflakes, nanodiscs and nanofilms.

The nanostructured material can be made of carbonaceous material, a ceramic, glass, such as soda-lime glass, borosilicate glass, acrylic glass, isinglass (Muscovy-glass), aluminium oxynitride; a metal, such as titanium; a metal oxide, a polypyrrole or mixtures of nanostructured materials made of different of the aforementioned substances.

In another embodiment, the energy charge storage device comprises at least one electrode made of a carbonaceous material. The carbonaceous material can be a nanostructured hydrophobic material forming a first layer which is arranged on a nanostructured hydrophilic material forming a second layer. In another embodiment, the electrode made of a carbonaceous material comprises a single layer comprising a mixture of a nanostructured hydrophobic material and a nanostructured hydrophilic material.

The mesopores in this embodiment can have a maximal dimension between about 2 to 50 nm. They can be made of a nanostructured material as already referred to above (e.g. nanotubes, nanowires etc.) The nanostructured material can be made of any material already referred to further above.

In one embodiment, the nanostructured hydrophilic material can comprise a linker (functional group) on its surface which can include but is not limited to a hydroxyl group, pyrenes, esters, thiols, amines, a carboxyl group or mixtures thereof. Those linkers have already been referred to further above and the different groups, such as hydroxyl group, carboxyl groups, etc., can be comprised in a molecule already referred to further above.

The nano structured hydrophilic material and the nanostructured hydrophobic material can be made of the same or different materials. These constructs comprised of a hydrophilic and hydrophobic material can be arranged on a support material, such as a paper-like free standing film. The paper-like free standing film can be a bucky paper or a sprayed or printed active material on a flexible conducting substrate, such as Al coated PET; or a free standing film of a nanostructured material.

In another embodiment, the nanostructured hydrophilic material can be mixed with nanoparticles, such as catalytic nanoparticles. The catalytic nanoparticles can include, but are not limited to noble metals, alloys, an intermetallic, such as Ag—Ni or Ag—Au; a metal oxide or a transition metal oxide or mixtures thereof. These nanoparticles can have a size between about 2 to 40 nm.

In one embodiment, the electrode layers comprising the hydrophilic or hydrophobic nanostructured material do not comprise a polymeric binder or do not comprise poly(1,1-difluoro-1,2-ethanediyl) (PVDF).

In another embodiment, the polyelectrolytes referred to herein further comprise a solvent. Such a solvent can include, but is not limited to $H_2O$, poly(vinylidene fluoride), diethyl carbonate, propylene carbonate, ethylene carbonate, dimethyl carbonate, dipropylcarbonate, dimethylsulfoxide, acetonitrile, dimethoxyethane, tetrahydrofuran, n-methyl-2-pyrrolidone or combinations thereof. Further examples of suitable solvents include, but are not limited to salt containing solutions, such as acids, including HCl, $H_2SO_4$, $H_3PO_4$, to name only a few, or bases, such as NaOH, KOH, to name only a few, or neutral solutions including different salts, such as NaCl, KCl, LiCl, LiF, $MgCl_2$.

The polyelectrolytes referred to herein can be used as electrolytes in an energy charge storage device which can include, but is not limited to a supercapacitor, a hybrid electrochemical capacitor, a metal-hydride battery and a fuel cell.

A hybrid electrochemical capacitor is an electrochemical energy storage device where one electrode is from a battery (typically Li-ion battery) and the other from a supercapacitor.

In another aspect, the present invention is directed to a method of manufacturing an energy charge storage device comprising:
  preparing a polyelectrolyte polymer film made of a polyelectrolyte referred to herein; and
  arranging or stacking the polymer film in between a first and a second electrode to obtain an energy charge storage device.

The first and second electrode can be supported by a substrate which is arranged/located on the side of the electrode not facing the polyelectrolyte polymer film. The substrate can be a paper-like free standing film or a polymer. Examples for polymers include, but are not limited to polypropylene (PP), polyethylene (PE), poly(vinyl chloride) (PVC), fluoroplastics, poly(vinyl fluoride) (PVF), polytetrafluoroethylene (PTFE), polystyrene, polyetheretherketone (PEEK), polyurethane, polycarbonate, polyethylene naphthalate (PEN) or polyimide (PI). The paper-like free standing film can be a bucky paper or a sprayed or printed active material on a flexible conducting substrate, such as Al coated PET; or a free standing film of a nanostructured material as referred to herein.

The polyelectrolyte polymer film can have any desirable thickness depending on its application. A thinner polymer film can reduce the device resistance. For example, the polyelectrolyte polymer film can have a thickness of between about 0.01 mm to about 1 cm, or 0.01 mm to about 0.5 mm, or 0.02 mm to about 0.7 mm, or 0.06 to about 0.8 mm, or 0.1 to about 0.8 mm, or 0.1 to about 1 cm.

The polyelectrolyte polymer films referred to herein can be used to manufacture printed electronic devices using simple roll-to-roll printing processes. Compared to conventional batteries/supercapacitors, the energy charge storage devices referred to herein would be compatible with devices such as smart cards, electronic paper, wearable electronics, and the like. For example, printable supercapacitors and batteries using the polyelectrolyte polymer film referred to herein can be directly printed on to surface of electronics and thus can be directly integrated in to disposable displays, such as RFID tags.

By "consisting of" is meant including, and limited to, whatever follows the phrase "consisting of". Thus, the phrase "consisting of" indicates that the listed elements are required or mandatory, and that no other elements may be present.

By "comprising" it is meant including, but not limited to, whatever follows the word "comprising". Thus, use of the term "comprising" indicates that the listed elements are required or mandatory, but that other elements are optional and may or may not be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

Examples

Manufacture of Electrolyte Based on Polyelectrolyte

A poly(styrenesulfonic acid) (PSSH) polymer electrolyte was prepared by adding 2 g of PSSH powder in 10 ml deionized water at room temperature and ultra-bath sonication was carried out for 30 minutes to obtain a clear solution.

Figure 6:
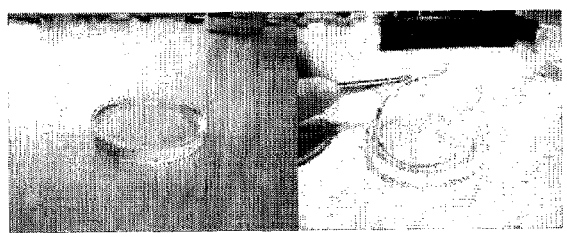
FIG. 6 shows a clear solution which was heated to 60° C. for 6 hours in a petri dish (left image) to obtain a polyelectrolyte gel film (right image) with a thickness of between about 0.6 mm to about 0.8 mm (600 μm to 800 μm).

Subsequently, the clear solution was heated to 60° C. for 6 hours in a petri dish to obtain a polymer electrolyte film (0.6-0.8 mm thickness) (see FIG. 6). Poly(styrenesulfonic acid) (PSSH) polyelectrolyte film acts both as the separator between the two electrodes, preventing electrical short-circuit and also as electrolyte allowing ionic charge transfer to take place.

Preparation of Conventional Electrolyte Based on Phosphoric Acid and PVA

A polyvinyl alcohol (PVA) acidic polymer electrolyte was prepared by heating 5 g of polyvinyl alcohol (PVA) monomer (Alfa Aesar, 98-99%, medium/high molecular weight) in 50 ml deionized water at 90° C. to obtain a clear gel-like solution to which 3 ml of $H_3PO_4$ (Sigma-Aldrich, 85% purity) was added under continuous stirring. Air bubbles and excess water in the gel-like solution were removed using a vacuum desiccator, and heating to 60° C. for 4 hours respectively to obtain a polymer electrolyte film with 0.5 mm thickness Manufacture of an Electrode Based on Activated Carbon An activated carbon solution with a concentration of 3 mg/ml was obtained by adding 90 mg of activated carbon powder in 30 ml isopropanol and tip sonication was carried out for 10 minutes to ensure well dispersion. The solution was then drop cast onto an aluminium coated polyethylene terephthalate (Al-PET) substrate which was heated to 150° C., until a black uniform layer formed on the substrate. The mass of the Al-PET substrate before and after drop-casting was measured using weighing balance, which indicated the mass of activated carbon was approximately 8 mg for a substrate area of 4.5 $cm^2$.

Manufacture of an Electrode Based on Carbon Nanotubes

For preparing supercapacitor electrodes, a single walled carbon nanotube (SWCNT) suspension (0.2 mg/ml in deionized water) was filtered through a filter membrane (Whatman, 20 nm pore size, 47 mm diameter). The carbon nanotubes (CNT) were trapped on the surface of the filter, forming an interconnected network. After drying, the freestanding CNT network was peeled off from the filter (thickness about 20 μm) and used as electrode.

Assembly of a Supercapacitor Device and Testing

Figure 7:
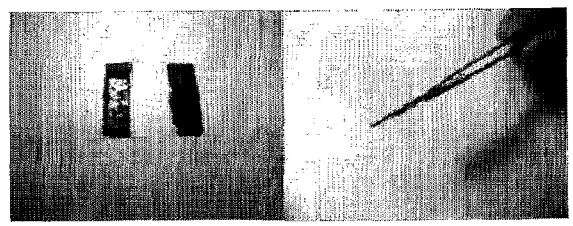
FIG. 7 shows a supercapacitor device which was fabricated by stacking a polyelectrolyte gel film in between two electrode strips which were secured onto a substrate using double-sided adhesive tape.

Supercapacitor devices were fabricated by casting the poly(styrenesulfonic acid) (PSSH) polyelectrolyte film in between two electrode strips. To obtain the electrode strips, the freestanding CNT network referred to above or the activated carbon material were drop cast on an aluminium coated polyethylene terephthalate (Al-PET) substrate/film as shown in FIG. 7.

Measurements

Capacitance was measured using a two electrode configuration. A cyclic voltammetry and galvanostatic charge/discharge cycle test was carried out using a computer controlled bipotentiostat (Pine Instrument, AFBP1) in the potential range of 0 to 1 V at a scan rate of 20 $mVs^{-1}$ and at a constant current of 0.4 to 1 mA.

Figure 8:
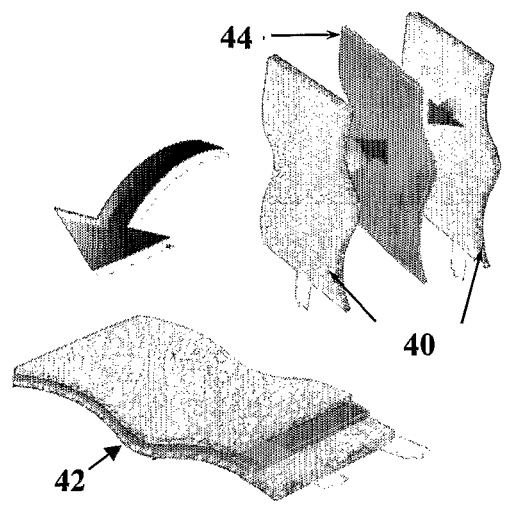
FIG. 8 shows an application of a polyelectrolyte 44 as electrolyte in a printable and flexible supercapacitor 42 which is obtained by arranging the polyelectrolyte layer 44 between the carbon nanotube layer electrodes 40.
Figure 9:
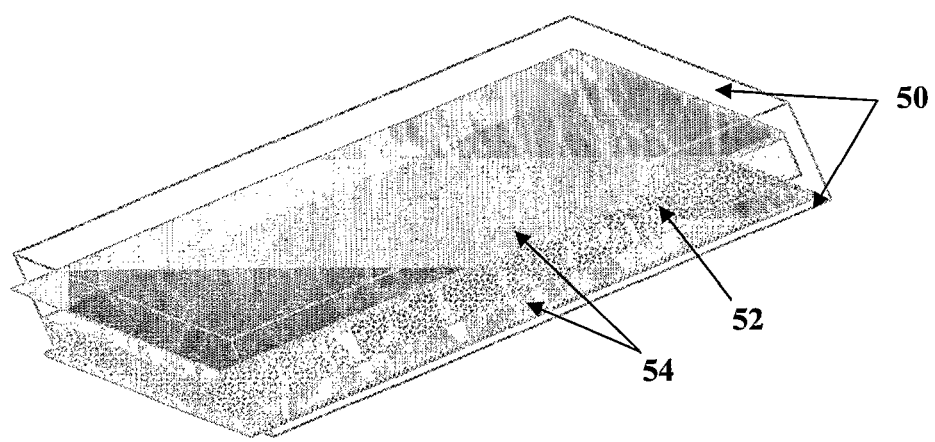
FIG. 9 shows an application of a polyelectrolyte 52 as electrolyte in a supercapacitor in which the polyelectrolyte layer 52 is arranged between two activated carbon electrodes 54 which are arranged on an aluminium coated polyethylene terephthalate (Al-PET) substrate 50.

As previously mentioned, polyelectrolytes represent a special class of polymers whose repeating units bear an ionisable electrolyte group. These group will dissociate in aqueous solutions (water), making the polymers charged, hence they possess properties similar to both electrolytes (salts) and polymers (high molecular weight compounds), and are sometimes called as polysalts. Their properties are defined mainly by the electrostatic interactions within the macromolecule and with the small counter ions, which compensate their charge. Polyelectrolyte solutions are electrically conductive (like salt) and are often viscous (like polymer) rendering them printable and flexible (FIG. 8). The viscosity of a printable electrolyte can be in the range of 0.1 to 20 Pa*s, and the viscosity of the poly(styrenesulfonic acid) (PSSH) polymer electrolyte used herein is about 1 Pas as measured using Physica MCR 501 Rheometers.

Versatility of polyelectrolyte as electrolyte in supercapacitors is tested using both the conventional electrode materials namely activated carbon and carbon nanotube electrodes. Supercapacitor device performance using polyelectrolytes was measured using galvanostatic and cyclic voltammetry techniques and compared with acidic PVA electrolyte.

Supercapacitor Performance Measured Using Cyclic Voltammetry (CV)

Figure 10:
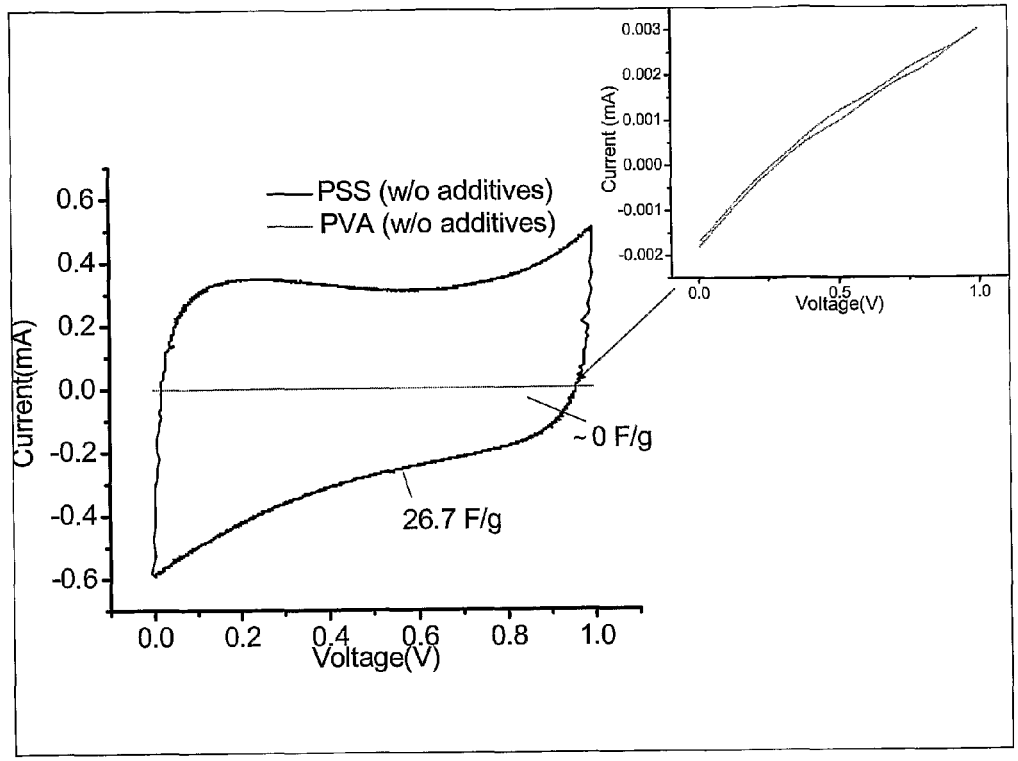
FIG. 10 shows cyclic voltammograms obtained from a supercapacitor using CNT electrodes with a pristine PSSH polyelectrolyte (26.7 F/g) and PVA (0 F/g). The inset in FIG. 10 shows a superimposed graph with the values for the current (in mA) at a different scaling.
Figure 11:
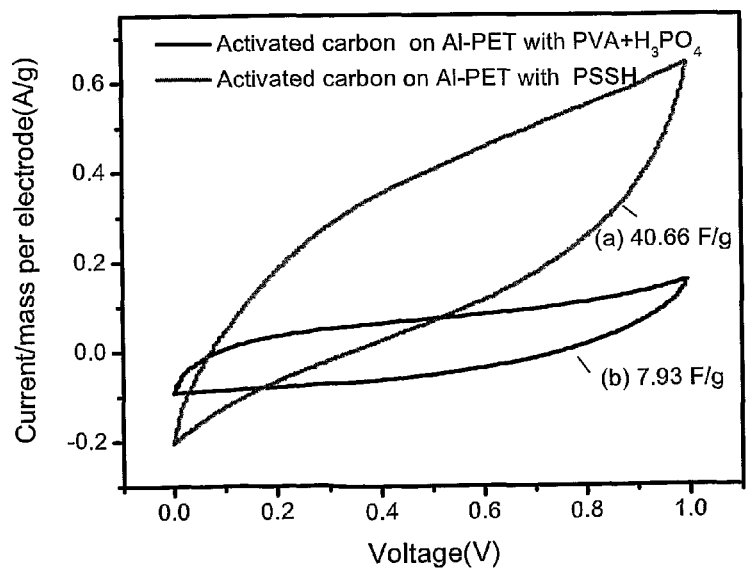
FIG. 11 shows cyclic voltammograms obtained from a supercapacitor with electrodes made of activated carbon. The activated carbon is deposited on Al-PET by drop-casting method. The electrolytes arranged between the electrodes are either PSSH or $PVA+H_3PO_4$.

Cyclic voltammograms of supercapacitor made using pristine PSSH polyelectrolyte and conventional polymer electrolyte (polyvinyl alcohol) are shown in FIG. 10. As can be seen, there is no current response from the polyvinyl alcohol (PVA) polymer, but PSSH polyelectrolyte with CNT shows marked charge storage (about 27 F/g) as seen from the charging and discharging of the supercapacitor device. Though PVA being a polymer can be fabricated as a thin film just like PSSH, it is unable to store charge because of lack of ionic groups in its polymeric chain. Similar behavior was seen with activated carbon used as electrodes also (FIG. 11), in which PSSH showed large specific capacitance of 41 F/g which is five times more than PVA based electrolyte.

Figure 12:
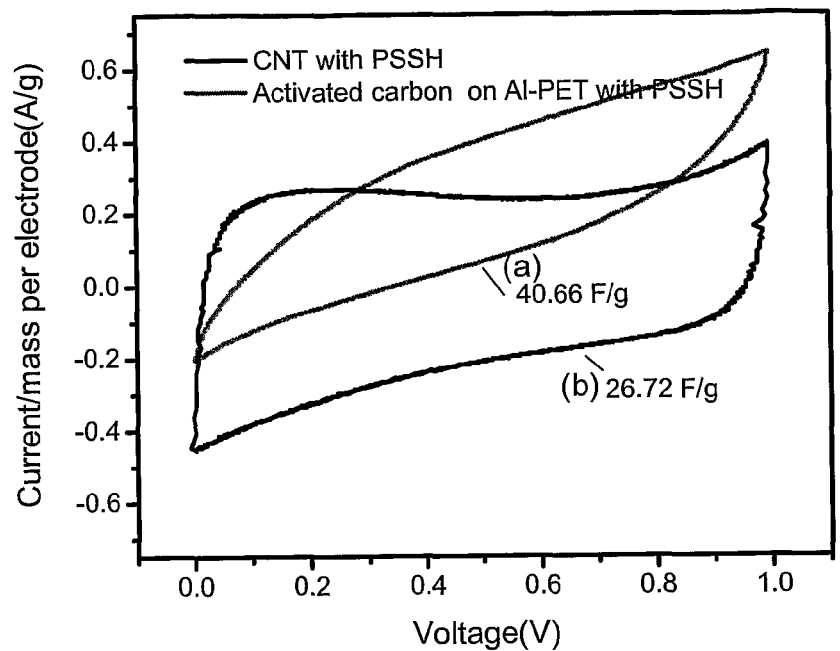
FIG. 12 shows cyclic voltammograms obtained from two different supercapacitors. Both supercapacitors used PSSH as electrolyte. The first supercapacitor has CNT electrodes while the other supercapacitor has an activated carbon electrode deposited on Al-PET.

FIG. 12 shows a comparison of the specific capacitance using PSSH polymer electrolyte using activated carbon and CNT electrode. Activated carbon on Al-PET electrodes gave rise to twice the capacitance of CNT electrode with PSSH polymer electrolyte, which caused by higher current obtained within the same voltage range (from 0 to 1 V), and this somehow indicates that activated carbon has higher surface area then CNT and comparable conductivity which contributed by the aluminium coated PET.

The specific capacitance of the supercapacitors normalized to the mass of the electrode was calculated from the cyclic voltammograms using the equation $$C = \frac{2I}{\Delta V \times A}$$

Where I is the average current corresponding to the voltage applied, $\Delta V$ is the voltage scan rate used and A is the area per electrode. Supercapacitor devices made of PSSH polyelectrolyte exhibited a capacitance value of 27 F/g which is much higher than PVA (<1 F/g). This is attributed to the polyelectrolyte chains dissociating into polyanions and protons upon the application of an electric field. The protons move to the negatively charged electrodes, while the immobile polyanion chains stay close to the positively biased electrode which leads to the formation of an electric double layer thus contributing to the specific capacitance (FIGS. 1 and 2).

Figure 13:
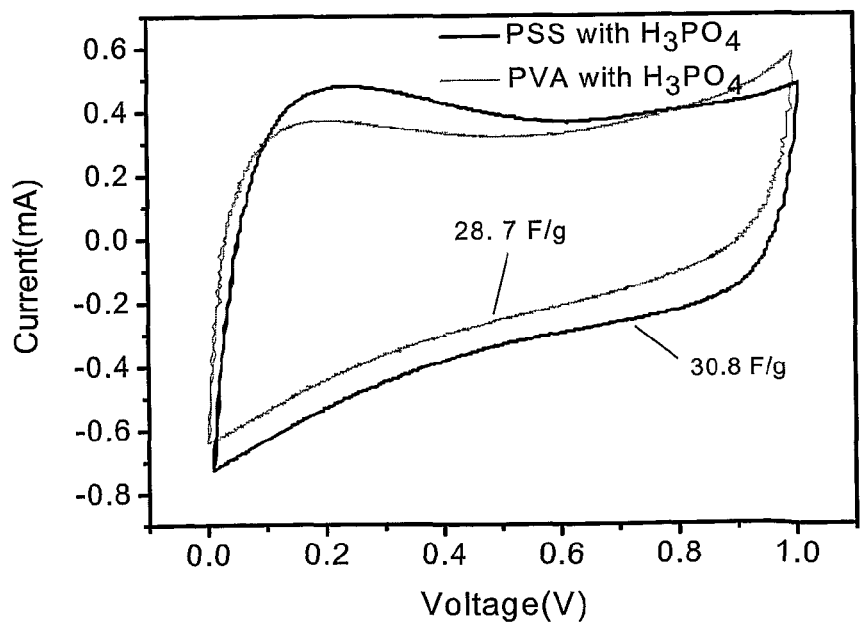
FIG. 13 shows cyclic voltammograms obtained from two different supercapacitors. Both supercapacitors have CNT electrodes. The electrolyte is PSSH with $H_3PO_4$ for one supercapacitor and PVA with $H_3PO_4$ for the other supercapacitor.

Application of polyelectrolytes described herein in supercapacitors eliminates the need for the addition of conducting salts, such as lithium boron tetrafluoride solute, to the electrolyte as the polymer backbone itself acts as a charge carrier. Using such polyelectrolytes the manufacturing cost can also be reduced substantially. FIG. 13 shows the effect of addition of phosphoric acid salt in to PVA, there is an enormous increase in the specific capacitance but still PSS with $H_3PO_4$ mixture yields higher specific capacitance. This shows the applicability and versatility of these polyelectrolytes in supercapacitors.

Supercapacitor Performance Measured Using Galvanostatic Studies

Figure 14:
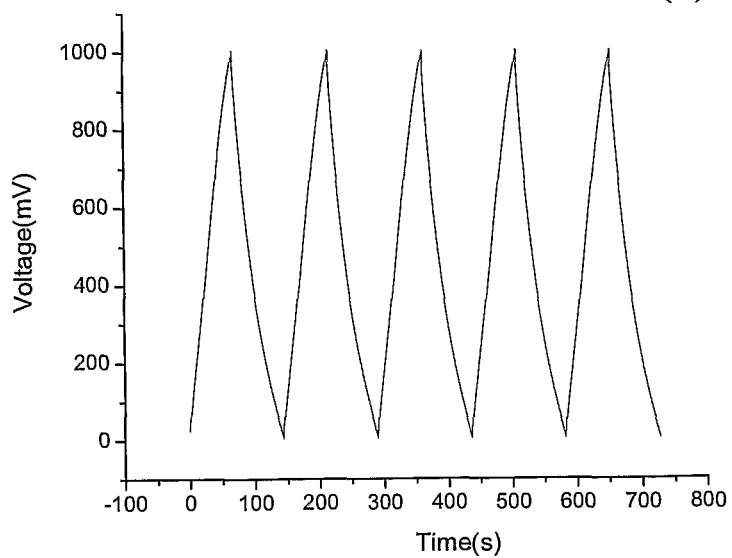
FIG. 14 shows galvanostatic curves obtained from a supercapacitor with CNT electrodes. Different electrolytes have been used.
Figure 14:
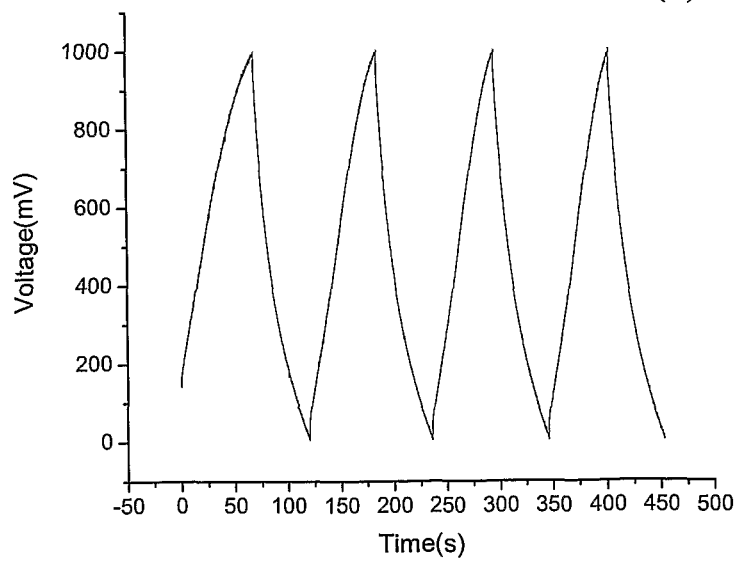
Figure 14:
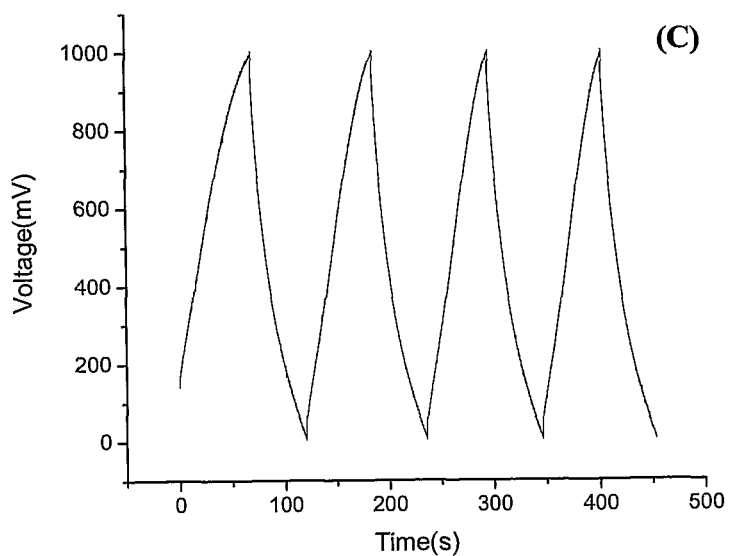
Figure 15:
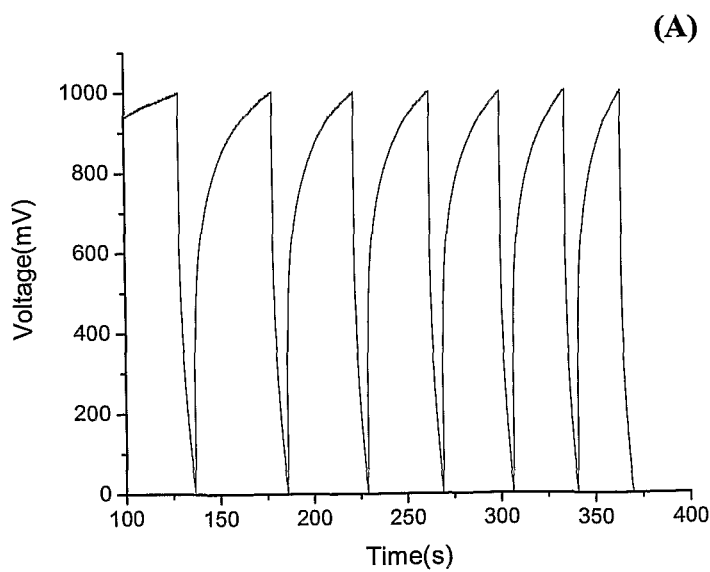
FIG. 15 shows galvanostatic curves obtained from a supercapacitor using activated carbon electrodes. The activated carbon is deposited on Al-PET. Different electrolytes have been used.
Figure 15:
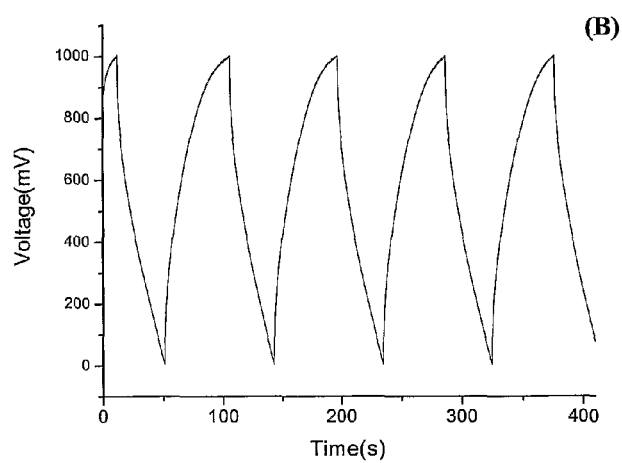

Galvanostatic charge-discharge measurements on PSSH electrolyte based on CNT electrodes indicates that PSSH is able to deliver higher specific capacitance (FIG. 14, Table 1) as compared to PVA polymer electrolyte. From the galvanostatic curves (FIG. 15 and the data summary in Table 1) of the devices with activated carbon on Al-PET with PSSH polymer electrolyte also exhibited higher capacitance (13 F/g) and relatively lower internal resistance (190Ω) as compared to same electrode materials with PVA acidic polymer electrolyte, whereas CNT electrode with PSSH+ $H_3PO_4$ electrolyte shows the lowest internal resistance (159Ω), and comparable capacitance (29 F/g).

TABLE 1

Summary of capacitance and internal resistance of six devices with different combination of electrode and polymer electrolyte

| Electrode | Electrolyte | Thickness (mm) | Capacitance (F/g) | Internal resistance (Ω) | Internal resistance/thickness (Ω/mm) |
|---|---|---|---|---|---|
| CNT | PSSH | 0.66 | 9.96 | 244.14 | 367.5 |
| CNT | PSSH + $H_3PO_4$ | 0.66 | 28.58 | 158.69 | 239.6 |
| CNT | PVA | 0.33 | 0 | N/A | N/A |
| CNT | PVA + $H_3PO_4$ | 0.49 | 19.95 | 162.76 | 331.2 |
| Activated carbon on Al coated PET | PSSH | 0.66 | 12.61 | 190.43 | 228.5 |
| Activated carbon on Al coated PET | PVA + $H_3PO_4$ | 0.49 | 5.72 | 292.97 | 597.9 |

The galvanostatic studies corroborates the CV results on both CNT and activated carbon electrodes clearly indicate that the PSSH without any solvent addition can perform at about the same standard as the baseline gel-electrolyte PVA with $H_3PO_4$. PSSH showed higher capacitance as compared to PVA. The difference in the capacitance values is due to the internal resistance of the device which plays a major role in galvanostatic measurements. The internal resistance is however reduced significantly by the addition of $H_3PO_4$ to PSSH. Other possibilities would be to incorporate organic solvents such as benzimidazole.

Figure 4:
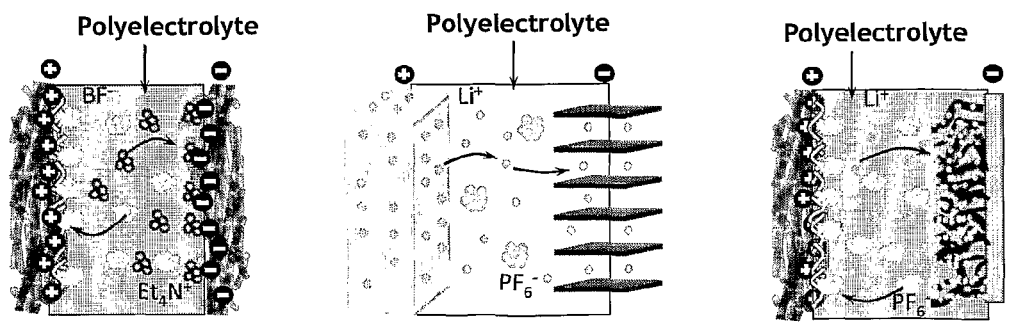
FIG. 4 shows possible applications for the polyelectrolyte electrolyte referred to herein for the manufacture of different energy charge storage devices. The left image in FIG. 4 shows a common supercapacitor utilizing high surface area carbon based electrode material and an organic or inorganic liquid electrolyte comprising a liquid solvent and inorganic/organic salt, (namely Et$_4$NBF$_4$). This electrolyte can be replaced by a polyelectrolyte described herein. The middle image in FIG. 4 shows a common Li ion battery consisting of an Li containing intercalation compound (e.g. $LiCoO_2$) as cathode, e.g. graphite as anode, and an Li ion containing salt (here $LiPF_6$) as organic solvent electrolyte. Also this electrolyte can be replaced by a polyelectrolyte described herein, such as a polyelectrolyte further comprising a cation, such as $Li^+$. The right image in FIG. 4 shows a common electrochemical hybrid capacitor (HEC) having one electrode similar to a supercapacitor that stores charge in the electrical double layer (left electrode) and the other electrode comprises of lithium intercalation material, wherein the HEC contains a liquid electrolyte (here $LiPF_6$). Also this electrolyte can be replaced by a polyelectrolyte described herein.
Figure 5:
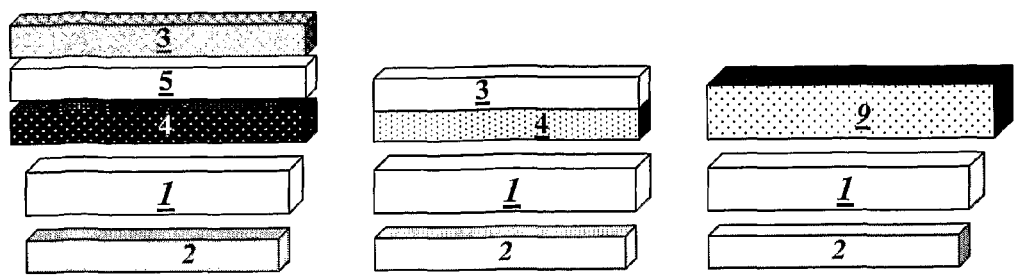
FIG. 5 shows the application for the polyelectrolyte electrolyte referred to herein for the manufacture of a zinc-air battery. In the left image a zinc air battery is disclosed in which the cathode is composed of a hydrophobic carbon material 3 arranged on a nickel(Ni)-mesh 5 which again is arranged on a hydrophilic carbon material 4. The hydrophilic layer 4 of the cathode is in direct contact with the polyelectrolyte electrolyte layer 1. The anode 2 can be a zinc anode which is separated from the cathode via the polyelectrolyte electrolyte layer 1 thus forming a non-flexible zinc-air battery. The middle image shows a two stacked layer configuration of a zinc-air battery which is almost identical to the zinc-air battery in the left image with the only difference that the cathode does not include a nickel(Ni)-mesh 5 between the hydrophobic carbon material 3 layer and the hydrophilic carbon material 4 layer thus rendering the zinc-air battery flexible. The right image shows a single mixed layer configuration of a zinc-air battery. The right image illustrates another flexible zinc-air battery assembly wherein the polyelectrolyte electrolyte layer 1 is arranged between a zinc anode 2 and a cathode 9 composed of a mixture of a hydrophilic and hydrophobic carbon material (carbon nanotubes, CNT). Thus, in contrast to the zinc-air battery in the left and middle image, the hydrophobic carbon material 3 and the hydrophilic carbon material 4 are mixed to form a single layer comprising the hydrophobic and hydrophilic carbon material.

Polyelectrolytes may also be used for applications in batteries, fuel cells (in lieu of widely used Nafion membrane), and also for hybrid electrochemical devices. The schematic in FIG. 4 shows the embodiment where the polyelectrolyte is used to enable a Li ion battery. A new breed of charge storage devices known as Hybrid Electrochemical Capacitors (HECs) that combine the advantages of lithium ion batteries and supercapacitors have the potential to revolutionize energy storage where a high energy-density, fast power capability, and long cycle life can be established. Schematically shown in FIG. 4, HECs can also function with polyelectrolytes used to replace the polymer and salt laden electrolytes. Various embodiments with polyelectrolytes used in Zinc-air batteries are also depicted in FIG. 5.

The PSSH used herein is a commercially available polyelectrolyte which is a proton conductor. Alternative designs are enclosed in FIG. 3 and include polycations based on dimethylamino-polystyrene (PS-NMe$_2$) which could be readily quaternised to PS-NMe$_3^+$ (FIG. 3(B)). Poly(vinylbenzyltrimethyl-ammonium chloride) (PVTAC) is shown as further example for a polycation (FIG. 3(D)). These polyelectrolytes represented in FIG. 3 comprise polyanions with lithium counter ions, including but not confined to PSS-Li (FIG. 3(C)), produce layers of positive ions at interfaces under the influence of applied electric fields. Polycations with hydroxide counter ions, including but not confined to polymers shown in FIG. 3(A) (di(pentyl-5-trimethylamino)-9-fluorene) and 3(B) (PS-NMe$_3$+), produce layers of negative hydroxide ions at interfaces under the influence of applied electric fields.

Synthesis of Metal Decorated Single Walled Carbon Nanotubes

Figure 16:
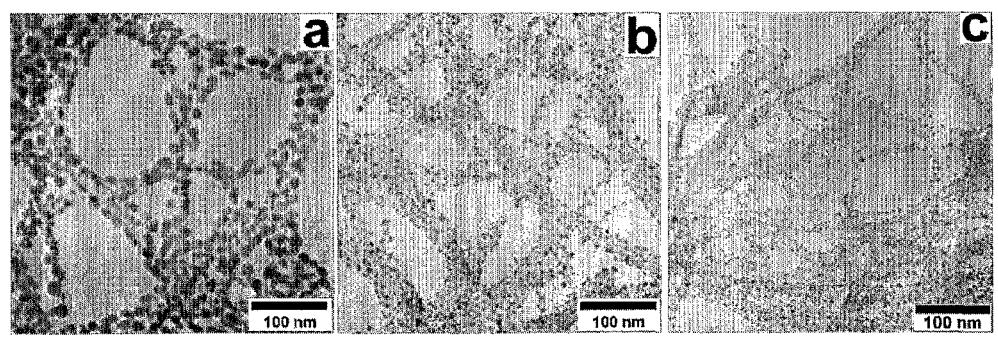
FIG. 16 shows TEM images of AgCNT with Ag nanoparticle sizes of (a) 15 nm (b) 6 nm (c) 3 nm.

Silver decorated single walled carbon nanotubes. To prepare silver nanoparticles decorated single-walled carbon nanotube, 0.08 g of single-walled carbon nanotubes (P3-SWNTs, Carbon Solution Inc.) were dispersed in 15 mL of deionized water followed by 20 min ultrasonic treatment (120 kW). The dispersion of silver nanoparticles was controlled through pH adjustment (4.3<pH<7.3) using 0.1 M NaOH (99%, Merck) that was added to a 100 mL aliquots of AgNO$_3$ (99.99%, Aldrich) (0.1-0.15 M). The SWNTs suspension was mixed with the pH adjusted AgNO$_3$ solution and stirred vigorously. The Ag-decorated SWNTs were separated from the mother liquor by centrifugation (15,000 rpm, 10 min), after that excess Na ion and nitrate were removed by multiple washing with deionized water. The final product was then redispersed in deionized water before use. The silver decorated single walled carbon nanotubes have been characterized (see FIG. 16) with a transmission electron microscope (TEM) operating in high resolution mode was conducted using JEOL 2100F operating at a voltage of 200 kV.

Gold decorated single walled carbon nanotubes. Gold stock solutions were prepared by adding 0.1 M NaOH (Sigma-Aldrich) dropwise to 20 ml of 3.0-6.3 mM HAuCl$_4$ (HAuCl$_4$.3H$_2$O, Alfa Aesar) until the pH stablized at predetermined values ranging from 4 to 12. SWNTs suspension (0.08 g in 15 mL of deionized water) was dispersed in the solution which was aged at 75° C. with vigorous stirring for certain period (15-60 min) after which the gold loaded catalysts were collected by filtration and washed repeatedly with deionized water to remove chloride.

Platinum decorated single walled carbon nanotubes. The solution of H$_2$PtCl$_6$.6H$_2$O (3.0-6.3 mM, Aldrich) in deionized water was adjusted to the desirable pH (4-9). SWNTs suspension (0.08 g in 15 mL of deionized water) was dispersed in the Pt precursor solution followed by the addition of methanol (Merck) as a reductant. The suspension was aged at 75° C. for 10-60 min and washed several times with deionized water.

Synthesis of MnO$_2$ Nanoflakes

Figure 17:
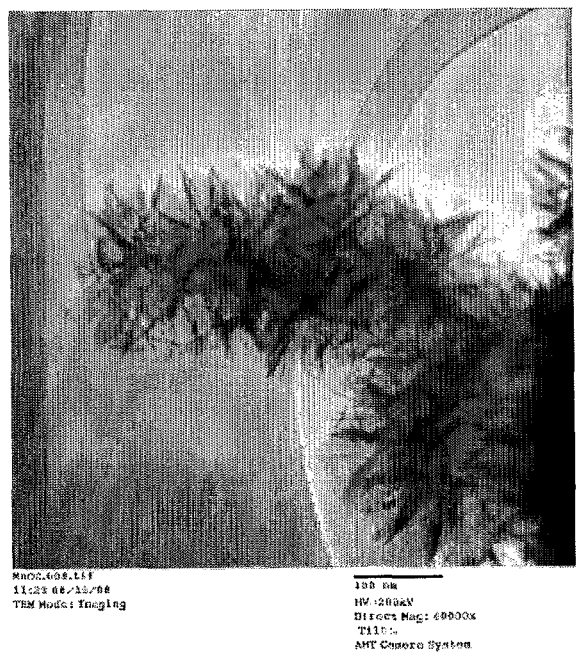
FIG. 17 shows a TEM image of $MnO_2$ decorated nanoflake (scale bar 100 nm).

Solution A containing 0.2 g of manganese nitrate Mn(NO$_3$)$_2$ dissolved in 10 mL of distilled water was added under vigorous stirring to Solution B containing 0.5 g of KMnO$_4$ in 10 mL of distilled water. The resultant solution was stirred for 2 h and then transferred into a Teflon autoclave and placed in the oven at temperatures 140-170° C. for 1-24 h to obtain the product which was washed several times with distilled water until the pH of the solution was 7. This was air dried in an oven at 100° C. for 24 h. FIG. 17 shows a TEM picture of such MnO$_2$ coated nanoflakes.

Synthesis of MnO$_2$ Decorated Single Wall Carbon Nanotube (SWNT)

Solution A containing 0.2 g-0.5 g of manganese nitrate Mn(NO$_3$)$_2$ or manganese acetate dissolved in 10 mL-20 mL of distilled water was added under vigorous stirring to Solution B containing 0.5 g-0.9 g of KMnO$_4$ in 10 mL-20 mL of distilled water. 0.05-0.2 g of SWNT was dispersed in the solution under stirring and heating at 50-80° C. The pH was controlled from 1-7 using 0.01 M HCl or 0.01-0.05 M HNO$_3$ (depending on the pH the MnO$_2$ particle size/dispersity varies). The resulting suspension after stirring for 1-2 h is centrifuged, washed with distilled water and dried in oven at 100° C. for 24 h.

Manufacture of an Electrodes Comprising Hydrophobic and Hydrophilic Nanostructured Materials Two different type of electrodes were manufactured, namely AE (air electrode) Type 1 and 2 electrodes.

In one embodiment, AE Type 1 electrodes consist of hydrophobic CNT (100%) and hydrophilic CNT (100%) laminated or stacked on top of each other. These may (or may not) comprise Ag decorated CNTs (manufacture described further above). Described is the manufacture of an air electrode based on carbon nanotubes (CNTs). Hyrophobicity can be controlled by carboxylic acid functionaliztion of CNTs. Carbon in both the layers are replaced by high surface area CNTs. In this configuration, the hydrophilic layer consists of carboxylic acid functionalized CNT (COOH-CNT) and the hydrophobic layer is made up of pristine CNT (P-CNT).

In another embodiment, AE Type 2 electrodes consist of a homogeneous mixture of hydrophobic and hydrophilic CNT mixed with each other. These may (or may not) comprise Ag decorated CNTs (manufacture described further above). This represents a unified approach to fabricate a single layer air electrode that consists of hydrophilic, hydrophobic and the catalyst components. The hydrophilic layer of the air electrode will consist of COOH-CNT, namely P3CNT (with or without a catalyst) and the hydrophobic layer comprises of P-CNT (hydrophobic CNT).

The AE electrodes of Type 1 and 2 were prepared by the following, the COOH-SWCNT (single wall carbon nanotubes) (Carbon Solutions Inc.) or Ag-decorated single wall carbon nanotubes suspension (0.2 mg/ml in deionized water) or a mixture of P/COOH SWCNT were filtered through a filter membrane (Whatman, 20 nm pore size, 47 mm diameter). The CNT falls through the pores and is trapped on the surface of the filter, forming an interconnected network. After drying, the CNT network was peeled off from the filter as a freestanding thin film of thickness of approximately 20 μm, and was directly used as the electrode. Circular pieces of these air cathodes were punched out using a die set (16 mm). The electrode material can be supported by a substrate, such as bucky paper.

The invention claimed is:

1. An energy charge storage device comprising a first and second electrode and a printable polymer gel electrolyte positioned between the first and second electrodes, wherein:
   the polymer gel electrolyte forms a separator between the first and second electrodes and is in direct contact with the first and second electrodes,
   said polymer gel electrolyte consists of a printable homopolymeric polyelectrolyte or a printable copolymeric polyelectrolyte,
   said homopolymeric polyelectrolyte comprises a single homopolymer or said copolymeric polyelectrolyte comprises a single copolymer, and
   said energy charge storage device is selected from the group consisting of a supercapacitor, a hybrid electrochemical capacitor, and a metal-hydride battery.

2. The energy charge storage device of claim 1, wherein said printable copolymeric polyelectrolyte consists of at least two different monomers which are selected from acids or bases;
   wherein said acids are selected from the group consisting of phosphonic acid, acrylic acid, vinyl sulphuric acid, vinyl sulphonic acid, vinyl phosphonic acid, methacrylic acid, anetholsulphonic acid, styrene sulfonic acid and derivatives thereof;

wherein said bases are selected from the group consisting of ethyleneimine, vinylamine, 2-vinylpyridine, 4-vinylpyridine, 2-methyl-5-vinylpyridine, trimethylamino styrene, allylamine, diallyldimethylammonium, di(pentyl-5-trimethylamino)-9-fluorene and derivatives thereof.

3. The energy charge storage device of claim 1, wherein said printable homopolymeric polyelectrolyte is a polyacid or a polybase.

4. The energy charge storage device of claim 3, wherein said polyacid is selected from the group consisting of alginic acid, phytic acid, polyvinyl sulphuric acid, polyvinyl sulphonic acid, polyvinyl phosphonic acid, polyacrylic acid, polymethacrylic acid, polyanetholsulphonic acid, polystyrene sulfonic acid, oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, derivatives of the aforementioned substances and combinations thereof.

5. The energy charge storage device of claim 3, wherein said polybase is selected from the group consisting of polyvinylpyridine, polyvinylaziridine, polyimidazole, polylysine, chitosan, poly(amino and alkylated amino)ethylenes, ethoxylated polyethyleneimine, propoxylated polyethyleneimine, polyethyleneimine, polyvinylamine, poly(2-vinylpyridine), poly(4-vinylpyridine), poly(2-methyl-5-vinylpyridine), trimethylamino polysterene, polyallylamine, polydiallyldimethylammonium, di(pentyl-5-trimethylamino)-9-polyfluorene, ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl derivatives of the aforementioned substances and combinations thereof.

6. The energy charge storage device of claim 1, wherein said printable homopolymeric polyelectrolyte or copolymeric polyelectrolyte comprises a counter ion which is selected from the group consisting of $Et_4N^+$, $Bu_4N^+$, $H^+$, $NH_4^+$, $Li^+$, $Na^+$, $K^+$, $Rb^+$ and $Cs^+$.

7. The energy charge storage device of claim 1, wherein said printable homopolymeric polyelectrolyte or copolymeric polyelectrolyte comprises a counter ion which is selected from the group consisting of $HSO_4^-$, $SO_4^{2-}$, $H_2PO_4^-$, $HPO_4^{2-}$, $PO_4^{3-}$, $ClO_4^-$, $PF_6^-$, $^-BF_4$, $F^-$, $Cl^-$, $Br^-$, $I^-$ and $OH^-$.

8. The energy charge storage device of claim 1, wherein said printable homopolymeric polyelectrolyte or copolymeric polyelectrolyte is polystyrene sulfonic acid (PSSH).

9. The energy charge storage device of claim 1, wherein said first and said second electrode are independently made of a material selected from the group consisting of metals, alloys, conductive polymers, graphite, carbonaceous materials, metal oxide particle coated nanostructured materials, noble metal particle coated nanostructured materials, ceramic, glass, isinglass (Muscovy-glass), borosilicate glass, acrylic glass and aluminum oxynitride.

10. The energy charge storage device of claim 9, wherein said carbonaceous material is a nanostructured hydrophobic material forming a first layer which is arranged on a nanostructured hydrophilic material forming a second layer.

11. The energy charge storage device of claim 9, wherein said carbonaceous material is a single layer comprising a mixture of a nanostructured hydrophobic material and a nanostructured hydrophilic material.

12. The energy charge storage device of claim 1, wherein said energy charge storage device is a supercapacitor.

13. The energy charge storage device of claim 1, wherein said printable homopolymeric polyelectrolyte or said copolymeric polyelectrolyte has a viscosity of between about 0.1 Pa*s to 20 Pa*s during printing.

14. A method of manufacturing an energy charge storage device of claim 1, comprising:
preparing a polymer film made of a printable polymer gel electrolyte, wherein said polymer gel electrolyte consists of a printable homopolymeric polyelectrolyte or a printable copolymeric polyelectrolyte, wherein said homopolymeric polyelectrolyte comprises a single homopolymer or said copolymeric polyelectrolyte comprises a single copolymer; and
arranging the polymer film in between a first and a second electrode.

15. The method of claim 14, wherein said first and second electrodes are supported by a substrate which is located on a side of one of the first and second electrodes not facing said polymer film.

16. The method of claim 14, wherein said polymer film has a thickness between about 0.1 mm to about 1 cm.

17. The method of claim 14, wherein said polymer film and said electrodes are manufactured by a roll-to-roll printing process.

* * * * *